UNITED STATES PATENT OFFICE 2,176,862

CEMENT

Henry H. Moreton, Santa Monica, Calif.

No Drawing. Application August 31, 1934
Serial No. 742,347

6 Claims. (Cl. 106—25)

This invention is a cement particularly adapted for general building purposes, and a process producing the same.

One of the objects of the invention is to provide a cement possessing the characteristic of an extraordinary degree of fineness, and the capability of effecting a more complete coating of the aggregates with which it is used, than is possible with ordinary Portland cement or other cements of that type. A further object is to provide a cement possessing the characteristic of less volumetric shrinkage and greater compressive strength than ordinary cements of the Portland cement type. Another object is to produce a cement of the character mentioned possessing high initial plasticity, thereby insuring better workability. A further object is to produce a cement which is more nearly waterproof than other cements of the Portland cement type.

The invention will be hereinafter fully set forth and particularly pointed out in the claims.

There has recently been discovered in the Mohave Desert region of California, a material which has not heretofore been identified in any authoritative publication. It is distinguishable from other previously known hydrous magnesium silicates such as talc and meerschaum by reason of its exceedingly high absorptive characteristics which cause it to form a gel in the presence of water and an exceedingly low percentage of alumina as determined by analysis of the product. For this reason it has been termed "colloidal" so as to distinguish from other hydrous magnesium silicates. No better method of identification of this material is known to me than the following typical representative analysis:

| | |
|---|---|
| Silica | 28.92 |
| Alumina | .82 |
| Calcium oxide | 21.50 |
| Ferric oxide | .08 |
| Magnesia | 14.07 |
| Soda | 2.34 |
| Loss on ignition | 32.23 |
| Absorption | 75% |
| Fusion point | |

The loss by ignition indicates the loss of undetermined organic matter carried by the sample analyzed.

From the foregoing analysis, it will be noted that the material is a natural silicate product of high absorption characteristics, and in this particular differs very materially from other complex silicates containing magnesia and alumina. It is a plasticizer of remarkable characteristics, and it will be noted that its inherent alumina content is so low that the quantities of any aluminates or any alumina-silicates which may be formed within the mixture will be negligible. The above analysis is typical and wherever proportions are given in the specification and claims, it is to be understood that they are approximate only because obviously said proportions are likely to vary considerably with different samples. In other words, the analysis is given as a typical example to identify as closely as possible the natural silicate product found in the Mohave Desert region of California possessing the above identified characteristics, and particularly an inherent alumina content so low that its influence within the mixture is practically negligible.

The cement constituting the present invention consists of a mixture of washed sand, pumicite, colloidal magnesium silicate and standard Portland cement. In practice, the washed sand and the Portland cement are placed in a suitable grinding apparatus, such as a tube mill for instance, and ground for approximately five hours. It is important to eliminate alumina as much as possible from the cement mixture, and for this reason the sand should be thoroughly washed to free it of alumina impurities as far as possible. It is preferred, however, to use silica sand or quartz because of its freedom of alumina, and further because during the grinding of the Portland cement and sand, the silica or quartz particles also perform a local grinding function which serves to reduce the cement to greater fineness than is usually possible in the ordinary grinding operation. In practice, the mixture of Portland cement and sand may be reduced to any desired degree of fineness. Excellent results have been obtained by a mixture reduced to approximately 40% to 90% through 200 mesh screen. This example, however, is illustrative only, and not intended to be binding, because the degree of fineness stated is not critical, and may be varied without departing from the spirit of the invention. Some time during the grinding of the sand and cement mixture, the pumicite and colloidal magnesium silicate are added so that the complete mixture is ground together. The stage at which the colloidal magnesium silicate and pumicite are added depends entirely upon how intimately it is desired to obtain the final admixture of the constituents of the cement, and may be determined empirically.

The proportions of the different ingredients may vary to suit different conditions, but it is preferred to use a mixture of approximately the following proportions, which are given for purposes of illustration and without intent to limit the invention:

|  | Per cent |
|---|---|
| Portland cement | 50 |
| Washed sand | 35 |
| Pumicite or ground pumice stone | 10 |
| Colloidal magnesium silicate | 5 |

The resultant mixture, after grinding is a cement of extreme fineness which can be mixed with sand or other aggregates and used for mortar, stucco and for general cement construction. Cement mortar containing the ingredients above mentioned, because of its highly colloidal character (extreme fineness) remains plastic for several hours, and then sets very quickly. After a period of several days (approximately 7 days) cement so mixed exhibits binding qualities far superior to other known cements now in general use.

The advantages of the invention will be readily understood by those skilled in the art to which it belongs. An important advantage is that due to the colloidal characteristics of the collodial magnesium silicate an extraordinary degree of fineness is obtained with the capability of effecting a maximum coating of the aggregates with which it is used. A further advantage is a characteristic of less volumetric shrinkage and greater compressive strength than is obtainable with ordinary cements of the Portland cement type. A further important advantage is that by reason of the exceedingly high absorptive characteristics of the colloidal magnesium silicate, the cement possesses a high initial plasticity, thereby insuring better workability, and because it is substantially free of alumina and of highly colloidal character, it remains plastic for several hours, and then sets very quickly, without perceptible shrinkage.

Although Portland cement is specifically mentioned herein, it is to be understood that other hydraulic cements may be substituted therefor without departing from the spirit of the invention, and that when the term Portland cement is used in the claims, other hydraulic cements are to be considered as equivalents thereof.

Having thus explained the nature of the invention and described an operative manner of constructing and using the same, although without attempting to set forth all of the forms in which it may be made, or all of the forms of its use, what is claimed is:

1. A cement consisting of a mixture of Portland cement, ground silica sand, pumicite, and a natural silicate product native to the Mohave Desert region of California, said natural silicate product being a gel-forming colloidal material containing approximately 14.07% of magnesia and characterized by a high water absorptiveness, and an inherent alumina content of approximately .82%, said alumina content being so low that the quantities of any aluminates or alumina-silicates which may be formed within the mixture will be negligible.

2. A colloidal cement consisting of a ground mixture of Portland cement, silica sand, pumicite, and a natural silicate product native to the Mohave Desert region of California, said natural silicate product being a gel-forming colloidal material containing approximately 14.07% of magnesia and characterized by a high water absorptiveness, and an inherent alumina content of approximately .82%, said alumina content being so low that the quantities of any aluminates or alumina-silicates which may be formed within the mixture will be negligible.

3. A cement consisting of a ground mixture of Portland cement, silica sand which is approximately free of alumina impurities, pumicite, and a natural silicate product native to the Mohave Desert region of California, said natural silicate product being a gel-forming colloidal material containing approximately 14.07% of magnesia and characterized by a high water absorptiveness, and an inherent alumina content of approximately .82%, said alumina content being so low that the quantities of any aluminates or alumina-silicates which may be formed within the mixture will be negligible.

4. A colloidal cement consisting of a ground mixture of approximately 50% of Portland cement, approximately 35% washed sand, approximately 10% of pumicite, and approximately 5% of a natural silicate product native to the Mohave Desert region of California, said natural silicate product being a gel-forming colloidal material containing approximately 14.07% of magnesia and characterized by a high water absorptiveness, and an inherent alumina content of approximately .82%, said alumina content being so low that the quantities of any aluminates or alumina-silicates which may be formed within the mixture will be negligible.

5. The method of manufacturing cement consisting of grinding together a mixture of Portland cement and silica sand, and adding to the ground mixture a second mixture consisting of pumicite, and a natural silicate product native to the Mohave Desert region of California, said natural silicate product being a gel-forming colloidal material containing approximately 14.07% of magnesia and characterized by a high water absorptiveness, and an inherent alumina content of approximately .82%, said alumina content being so low that the quantities of any aluminates or alumina-silicates which may be formed within the mixture will be negligible.

6. The method of manufacturing cement comprising grinding together a mixture of Portland cement and sand from which free alumina has been eliminated by washing, during the grinding thereof adding thereto a second mixture consisting of pumicite, and a natural silicate product native to the Mohave Desert region of California, said natural silicate product being a gel-forming colloidal material containing approximately 14.07% of magnesia and characterized by a high water absorptiveness, and an inherent alumina content of approximately .82%, said alumina content being so low that the quantities of any aluminates or alumina-silicates which may be formed within the mixture will be negligible.

HENRY H. MORETON.